US011012810B2

(12) United States Patent
Calvarese et al.

(10) Patent No.: US 11,012,810 B2
(45) Date of Patent: May 18, 2021

(54) CHARGE ROOM LOCATIONING

(71) Applicant: SYMBOL TECHNOLOGIES, LLC, Lincolnshire, IL (US)

(72) Inventors: Russell Calvarese, Stony Brook, NY (US); Richard J. Lavery, Huntington, NY (US); Menuka Gayan Senevirathna, Matara (LK); Dammika Prasad Wijethunga, Via Dehiowita (LK)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/412,912

(22) Filed: May 15, 2019

(65) Prior Publication Data

US 2019/0268719 A1   Aug. 29, 2019

Related U.S. Application Data

(63) Continuation of application No. 15/850,684, filed on Dec. 21, 2017, now Pat. No. 10,341,815.

(51) Int. Cl.
*H04W 4/02* (2018.01)
*H02J 7/00* (2006.01)
*H04W 4/33* (2018.01)
*H02J 50/90* (2016.01)
*H04W 4/80* (2018.01)

(52) U.S. Cl.
CPC ........... *H04W 4/023* (2013.01); *H02J 7/0044* (2013.01); *H02J 50/90* (2016.02); *H04W 4/02* (2013.01); *H04W 4/33* (2018.02); *H04W 4/80* (2018.02)

(58) Field of Classification Search
CPC ......... H04W 4/023; H04W 4/80; H04W 4/02; H04W 4/33; H02J 7/0044; H02J 50/90
See application file for complete search history.

(56) References Cited

U.S. PATENT DOCUMENTS

| | | | |
|---|---|---|---|
| 9,183,551 B2 * | 11/2015 | Nuzzi | G06Q 20/3224 |
| 9,301,100 B1 * | 3/2016 | Jampani | G01S 5/0278 |
| 10,341,815 B1 * | 7/2019 | Calvarese | H04W 4/02 |
| 2012/0252532 A1 * | 10/2012 | Williams | H04M 1/04 |
| | | | 455/566 |
| 2013/0091146 A1 * | 4/2013 | Stanger | G06F 16/29 |
| | | | 707/748 |
| 2016/0087486 A1 * | 3/2016 | Pogorelik | H02J 7/042 |
| | | | 320/108 |
| 2017/0250561 A1 * | 8/2017 | Li | H02J 50/90 |
| 2018/0098366 A1 * | 4/2018 | Cohn | H04W 76/14 |

* cited by examiner

*Primary Examiner* — Brandon J Miller
(74) *Attorney, Agent, or Firm* — Yuri Astvatsaturov

(57) ABSTRACT

A mobile device locationing system that overrides the reported position with that of the charge room when the AC charge signal is detected by the device.

16 Claims, 7 Drawing Sheets

CHARGE ROOM LOCATIONING

CROSS-REFERENCE TO RELATED APPLICATION

This application is a continuation of U.S. patent application Ser. No. 15/850,684, filed on Dec. 21, 2017, and incorporated herein by reference in its entirety.

BACKGROUND OF THE INVENTION

Locationing systems may be used to locate and track a mobile electronic device at a venue. RF, light or ultrasonic locationing systems, for example, may dispose an array of transmitters or receivers proximate to the venue. Mobile devices may be locationed at the venue. In such systems, the mobile devices must be charged from time to time. Dedicated charging spaces, or charge rooms, may be provided adjacent to the venue for charging the mobile devices. Extending a locationing zone to include charge rooms would require positioning expensive locationing hardware in the charge rooms.

Accordingly, there is a need for locationing mobile devices in charge rooms without extending the locationing zone to encompass the charge rooms.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
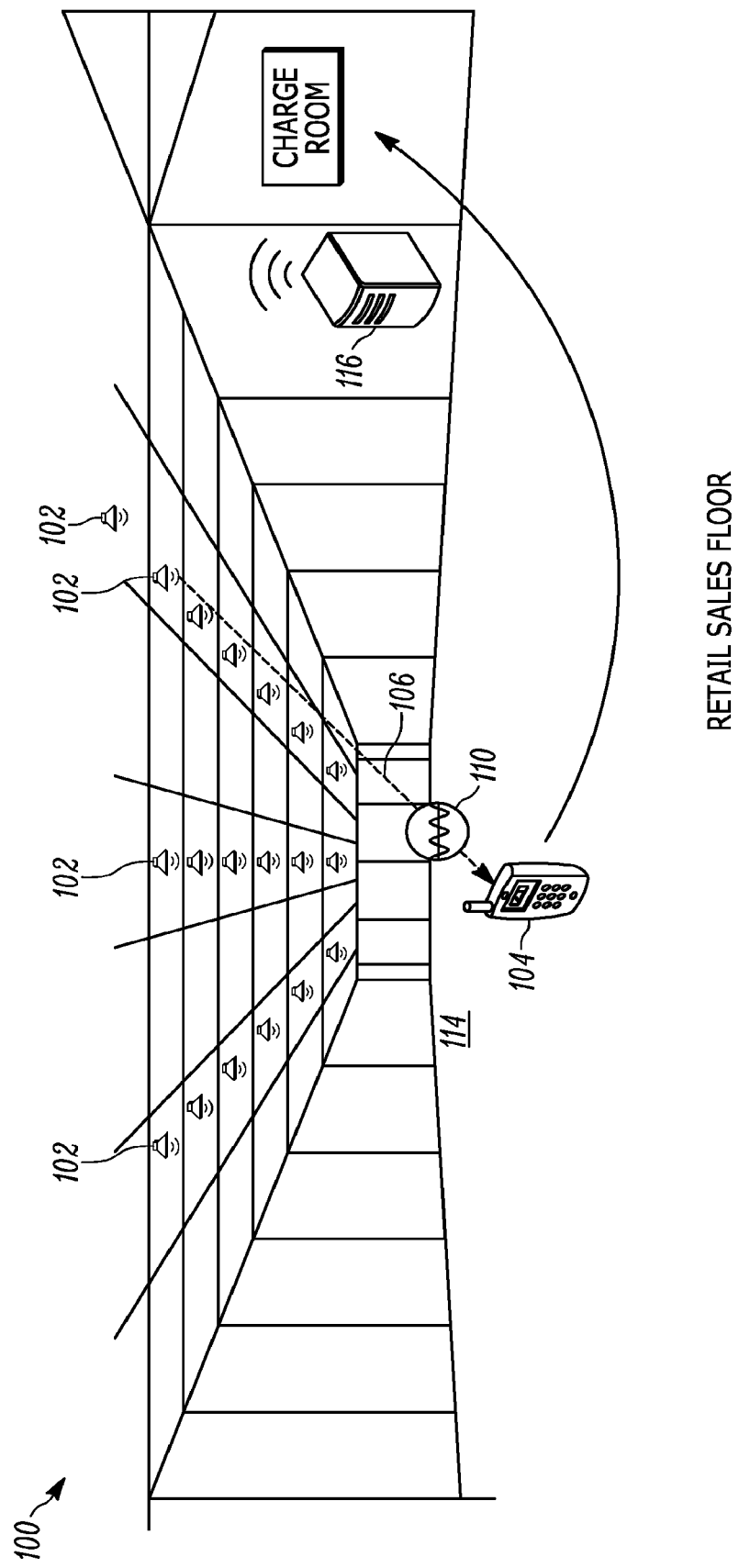
FIG. 1 is a schematic diagram of charge room locationing on a retail sales floor in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As described herein, embodiments of the present disclosure are directed a method and system of locationing a mobile device in a charge location. In some examples, the techniques include receiving a charge signal indicating external charging of a mobile. In some examples, the techniques include receiving characteristic of a charge location in a venue, where that venue may have more than one charge location. The techniques further include determining that the mobile device is at the charge location based on the charge signal and/or on the characteristic of the charge location at the venue, and outputting a locationing status associating the mobile device with the identified charge location. In some examples, the determining of the locationing status is performed at the mobile and the locationing status is, in some examples, output by the mobile device. In some examples, the locationing server determines the locationing status in response to a communication from the mobile device, such as an indication of the charge signal and/or an indication of the characteristic of the charge location.

determining, at a locationing server, the locationing status associated with the charge location in response to the mobile device communicating an indication of the charge signal and/or on the characteristic of the charge location at the venue. In some examples, the techniques include emitting a locationing pulse from a transmitter in an array of transmitters disposed proximate to a venue. The array of transmitters may be controlled by a locationing server and may define a locationing zone of the venue. The techniques may further include receiving, from the mobile device, signal characteristics of the locationing pulse detected by the mobile device.

FIG. 1 is a schematic diagram of a charge room locationing system 100 on a retail sales floor 114 including an array of ultrasonic transmitters 102 and mobile detector device 104 in accordance with some embodiments. The array of transmitters 102 are arranged proximate to the retail sales floor 114. In one implementation, the array of transmitters is arranged in a grid pattern in a ceiling disposed above a floor area. The transmitters 102 emit ultrasonic pulses that can be used to determine a location of the mobile detector device 104 by, for example, trilateration. In one implementation, the transmitters 102 are audio speakers emitting locationing pulses in the 20 KHz frequency band. In one implementation, a server 116 controls the emission of pulses from the transmitters 102 in the array. The server 116 may also communicate with and receive locationing information from the mobile detector device (e.g., characteristics of signal 106).

The mobile detector device 102 may be a handheld electronic device (e.g., smartphone, tablet, etc.) equipped with a microphone capable of receiving ultrasonic pulses in the frequency band used by the transmitters 102. The mobile detector device may be equipped with a microphone to sense ultrasonic pulses. The mobile detector device may sample signals detected by the microphone by sampling the microphone output or reading microphone output at intervals from a buffer. While in various illustrated examples herein, transmitters are described as a ultrasonic transmitters, in other implementations locationing may be based on other wireless communication transmitters, including Radio Frequency (RF) locationing systems, Bluetooth systems, Bluetooth Low Energy (BLE) systems, WiFi systems, beacon-based systems, or other wireless data transmitters, and further may include light based locationing systems using cameras or other optical sensors.

The array of transmitters 102 forms a locationing zone in which mobile devices may be located. The size of the locationing zone is an important factor in the quality of locationing services provided in the venue. Increasing the number of transmitters 102 in the array increases the density of potential locationing pulses, but also increases cost to purchase and install the system. Venues may be limited in the number of transmitters 102 that are feasible to install over the locationing area 114. If venues could reduce the size of the locationing zone, then a greater quality of service may be achieved without increasing hardware and installation costs.

One way to reduce the size of the locationing zone served by the transmitters 102 is to exclude charge rooms. Instead of spreading transmitter resources over an area that encompasses the charge rooms, detecting whether a mobile detector device is in a charge room can be done in other, less expensive ways. Since the server 116 is in communication with the mobile detector device 104, the server 116 may receive information from the mobile device that indicates a characteristic of a charge room is present and detected by the mobile device (e.g., a wireless network signal strength, visual characteristic of the charge room, electronic characteristic of the charge room, physical characteristic of the charge room, etc.).

It is noted that as used herein, references to a 'charge room' include references to any type of charge location, such as a location of a charger station, even if that charger station is not within a separate walled off portion of a venue.

In addition to reducing the size of a locationing zone, locationing of a mobile detector device may be enhanced by using the location of a charge room or a charger station as the determined location of the mobile detector device. Such locationing may be triggered by less system intensive ways, for example, by detecting one a mobile detection device is being charged and determining the location of that charging.

In an implementation, the server 116 may conclude that the mobile detector device 104 is present in a charge room based a charge signal detected by the mobile detector device 104 upon charging. In some examples, the charge signal is based on the mobile detector device 104 detecting an alternating current (AC) being supplied to the mobile detector device 104, for example an AC signal provided by an AC charger or AC charger station to charge the battery of the mobile detector device 104. When the mobile detector device 104 detects the AC signal, the mobile detector device 104 transmits a charge signal to the server 116 indicating that the mobile detector device 104 is being charged. In some implementations, upon detecting that its battery is switched from a battery depletion state to a battery charging state, the mobile detector device 104 transmits a charge signal. In some implementations, the mobile detector device 104 will periodically transmit the charge signal while the AC signal is being received, thus indicating to the server 116 that the mobile detector device 104 is continuing to receive charging. In an implementation, the mobile detector device 104 may be configured to differentiate between an external AC signal source, such as from a dedicated charger or charger station (i.e., a bank of chargers) in a charge room, from a local battery source attached to the mobile detector device 104, such as a direct current (DC) battery source contained with a charger mounted to the mobile detector device 104. The mobile detector device 104, for example, may differentiate between an AC charging source and a DC battery source. In some examples, the mobile detector device 104 may identify the presence of an AC charging source based on the current value detected, where current values above a threshold current value are identified as from an AC charging source thereby triggering communication of a charge signal and current values below a threshold will not trigger communication of the charge signal.

Upon receiving the charge signal from the mobile detector device 104, the server 116 may identify that the mobile detector device 104 is in a charge room, or at a charge location in a venue. In response, the server 116 may assign a locationing override for the corresponding mobile detector device 104, where that override sets the location of the mobile detector device 104 as the predefined location of the charge room or charger station, in place of the location determined by the locationing transmitters 102. In many instances, the location of the charge room or charging station may be more accurate than the location determined by the locationing transmitters 102, especially for considerably large venues.

In these ways, in various implementations, the server 116 may identify the charging of the mobile detector device 104 and the more precise location of the mobile detector device 104 based on receipt of a charge signal from the mobile detector device 104.

Other data, including charge room characteristic data, may be used to determine the location of the mobile detector device 104, for example, when there are multiple charge rooms or multiple charger station locations within a venue. Room characteristic data may be used in conjunction with charge signal data or, in some examples, independently from charge signal data.

The server 116 may be configured to execute computer instructions to perform operations associated with the systems and methods as described herein, for example, implement the example operations represented by the block diagrams or flowcharts of the drawings accompanying this description. The server 116 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used. As described below, the server 116 may be specifically configured for performing operations represented by the block diagrams or flowcharts of the drawings described herein.

The example server 116 of FIG. 1 includes a processor, such as, for example, one or more microprocessors, controllers, and/or any suitable type of processor. The example server 116 further includes memory (e.g., volatile memory or non-volatile memory) accessible by the processor, for example, via a memory controller (not shown). The example processor interacts with the memory to obtain, for example, machine-readable instructions stored in the memory corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.), or over a remote connection, such as the Internet or a cloud-based connection, that may be coupled to the server 301 to provide access to the machine-readable instructions stored thereon. The example server 116 may further include a network interface to enable communication with other machines via, for example, one or more computer networks, such as a local area network (LAN) or a wide area network (WAN), e.g., the Internet. The example network interface may include any suitable type of communication interface(s) (e.g., wired and/or wireless interfaces) configured to operate in accordance with any suitable protocol(s), e.g., Ethernet for wired communications and/or IEEE 802.11 for wireless communications. The server 116 further includes input/output (I/O) interfaces to enable receipt of user input and communication of output data to the user, which may include, for example, any number of keyboards, mice, USB drives, optical drives, screens, touchscreens, etc.

In one implementation, the server 116 may conclude that the mobile detector device 104 is present in a charge room also based at least in part on the absence of locationing information indicating the mobile detector device is the locationing area 114. The last known location of the mobile detector device 104 in the locationing area 114 can be used to conclude a mobile detector device 104 is in a particular charge room (e.g., "snapping" to the closest charge room based on coordinates of last ultrasonically detected location). In some implementations, the server 116 may conclude that the mobile detector device 104 is locationed in a charge room based on a characteristic of the charge room that is unique to that particular room. Examples of characteristics of the charge room include detection of a Wi-Fi SSID and signal strength, visual detection of a pattern or image known to represent the charge room, detection of a characteristic of a charge dock such as physical inclination angle of the dock, voltage received by the dock, data communication received by the dock, etc. In these ways, charge room specific characteristics may be used to identify the charge room in a venue or to identify from among a plurality of charge rooms in a venue.

Further still, in various implementations, the server 116 may determine that the mobile detector device 104 is in a charge room, as well as which charge room, based on a combination of charge room characteristics data and charge signal data received from the mobile detector device 104. In one implementation, in addition to sending a charge signal, the mobile detection device 104 may send charge room characteristics data, e.g., data from which the server 116 can determine the location of the mobile detection device 104. That charge room characteristic data may include, as discussed further herein, accelerometer data for the mobile detection device 104, captured image data from an image sensor of the mobile detection device 104. For example, different charge rooms or different charge locations within a venue may be set up to include charges with different tilt angles for holding a mobile detection device during charging. A dedicated charge room in a venue, for example a retail manager's office in a backroom of a venue where charging stations are located, may have a charger station that orients mobile detection devices at a 0°, 5°, 10°, 15°, or 20° orientation to a horizontal plane. While a charger station located within a venue might have a charger station that orients mobile detection devices at 60°, 70°, 80°, or 90° orientation to that horizontal plane. By sending both a charge signal and an accelerometer signal to the server 116—the accelerator signal indicating a tilt orientation of the mobile detection device 104 during charging—the server 116 will receive both a charge signal a charge room characteristic signal from which the server 116 determines that the mobile detection device 104 is charging and the location during charging. In some implementations, charger stations can be configured with an ability to adjust the tilt orientation that use, thereby allowing personal to manually adjust the tilt so that different charger stations, and preferably different locations of charger stations, are associated with different tilt orientations.

While these are examples, they demonstrate that the server 116 may determine a location of a mobile detection device not only from received charge signals, but where the charge signal alone leaves an ambiguity as to the location of the mobile detection device, charge room characteristic data may be obtained and used to resolve the ambiguity and identify the specific location where charging is occurring.

In addition to use in determining the location of a mobile detection device, charge room characteristics data may be used to alter the size of a locationing zone in a venue, for example, reducing the locationing zone in size thereby making locationing operations more accurate.

Figure 2:
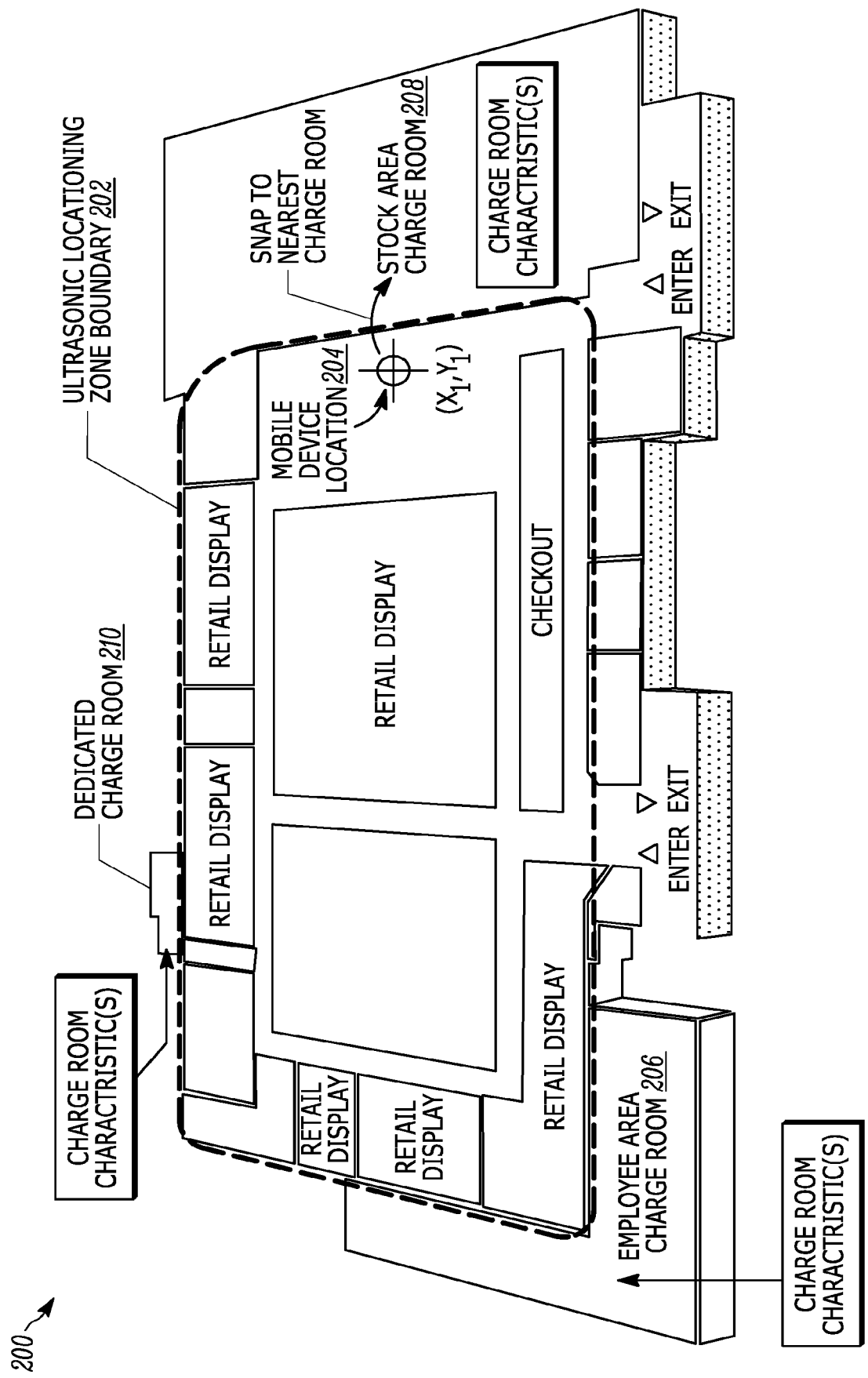
FIG. 2 is a schematic diagram of charge room locationing in a venue with multiple charge rooms in accordance with some embodiments.

Three-dimensional (3D) sensors are used to measure loads within vehicle trailers and shipping containers. 3D sensors, for example, measure distances from a back-wall of a trailer/container to the nearest load-wall inside that trailer/container. From these distances, operators can determine such metrics as the available storage space within a volume FIG. 2 is a schematic diagram of charge room locationing in a venue 200 with multiple charge rooms in accordance with some embodiments. An array of ultrasonic transmitters disposed proximate to the venue 200 define an ultrasonic locationing zone 202. When mobile device detectors are present within the ultrasonic locationing zone 202, ultrasonic locationing pulses are received by the mobile devices. Based on the characteristics of the locationing pulse signal received by the mobile devices (e.g., time of detection, intensity of signal, etc.), the mobile devices may be locationed within the zone 202 (e.g., a physical location may be determined within the zone within a margin of error dependent upon the configuration of the system). A mobile device location 204 may be stated in terms of a coordinate tuple (e.g., x, y value pair) describing a physical location at the venue 200.

In the example illustrated by FIG. 2, the ultrasonic locationing zone boundary 202 covers several areas of the venue including retail sales displays, a checkout area, and other areas that may be devoted to a variety of purposes (e.g., performance area, open areas, etc.). The ultrasonic locationing zone boundary excludes other areas of the venue 200 such as an employee area charge room 206, a stock area charge room 208, and a dedicated charge room 210. The charge rooms 206, 208, and 210 are examples of areas that the venue may use for charging mobile detector devices when they are not in use at the venue. For example, if the mobile detector devices include a mobile check-out terminal for processing customer orders, sales staff may take the devices to one of the rooms 206, 208, or 210 to charge when battery power runs low.

Each of the example charge rooms 206, 208, and 210 has a set of respective charge room characteristics that can be used to locate a mobile detector device since the example charge rooms 206, 208, and 210 are outside the ultrasonic locationing zone boundary 202 and thus not locatable by the array of transmitters in the ultrasonic locationing system. Examples of characteristics of the charge room include detection of a Wi-Fi SSID and signal strength, visual detection of a pattern or image known to represent the charge room, detection of a characteristic of a charge dock such as physical inclination angle of the dock, voltage received by the dock, data communication received by the dock, etc.

Figure 3:
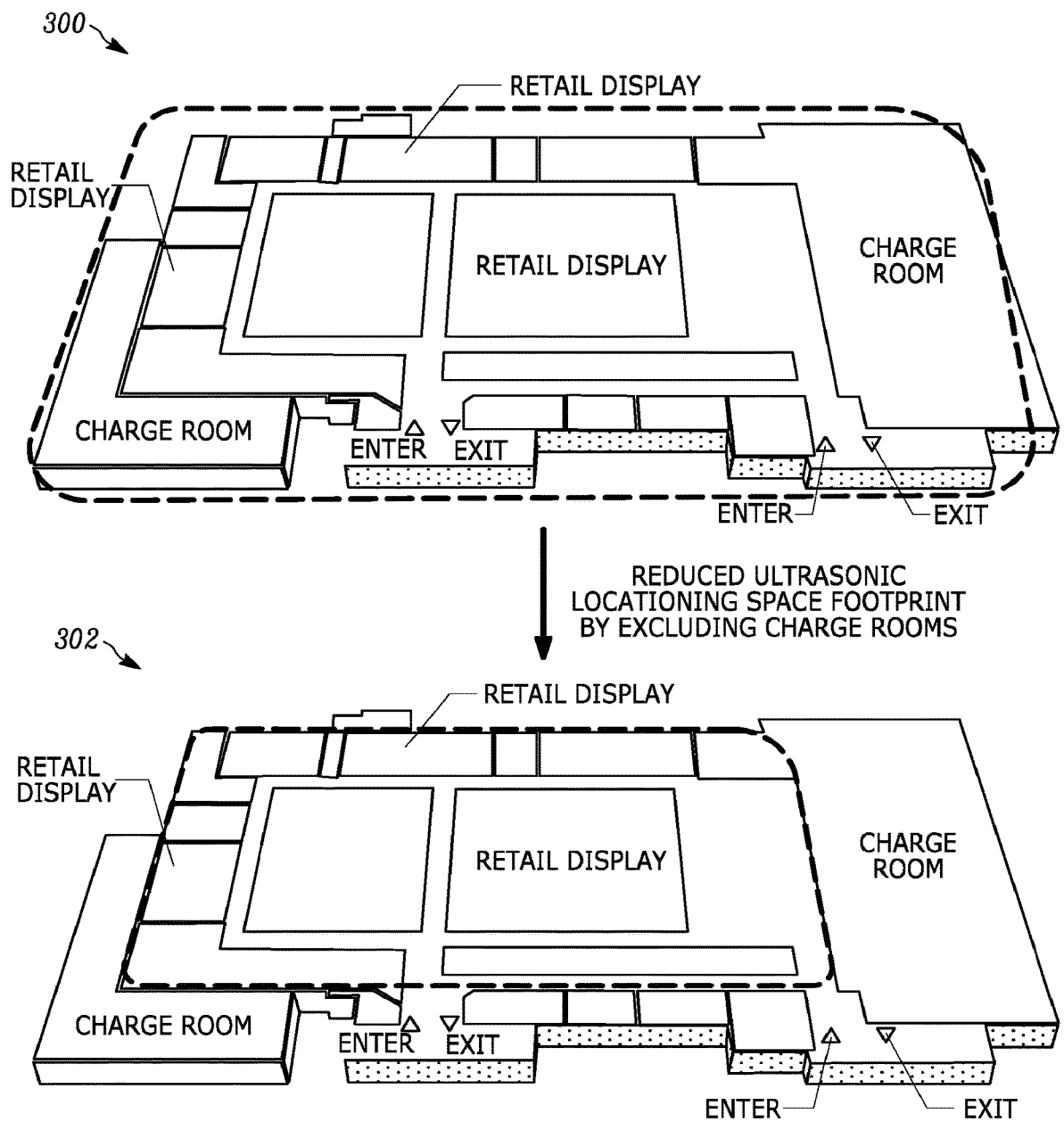
FIG. 3 is a schematic diagram of reducing a coverage zone of a locationing system in accordance with some embodiments.

FIG. 3 is a schematic diagram of reducing a coverage zone of a locationing system at a venue in accordance with some embodiments. The example operation shown in FIG. 3 reduces an ultrasonic locationing zone at the venue 302 compared to the venue 300. Reducing the size of the ultrasonic locationing zone may be based on reducing the number of planned transmitters at the venue 302, thus lowering purchase and installation costs. Alternatively, or additionally, the operation shown in FIG. 3 may include increasing the density of transmitters in the array proximate to the venue 302 such that a greater accuracy is achieved with the same number of transmitters as compared to the venue 300.

Figure 4:
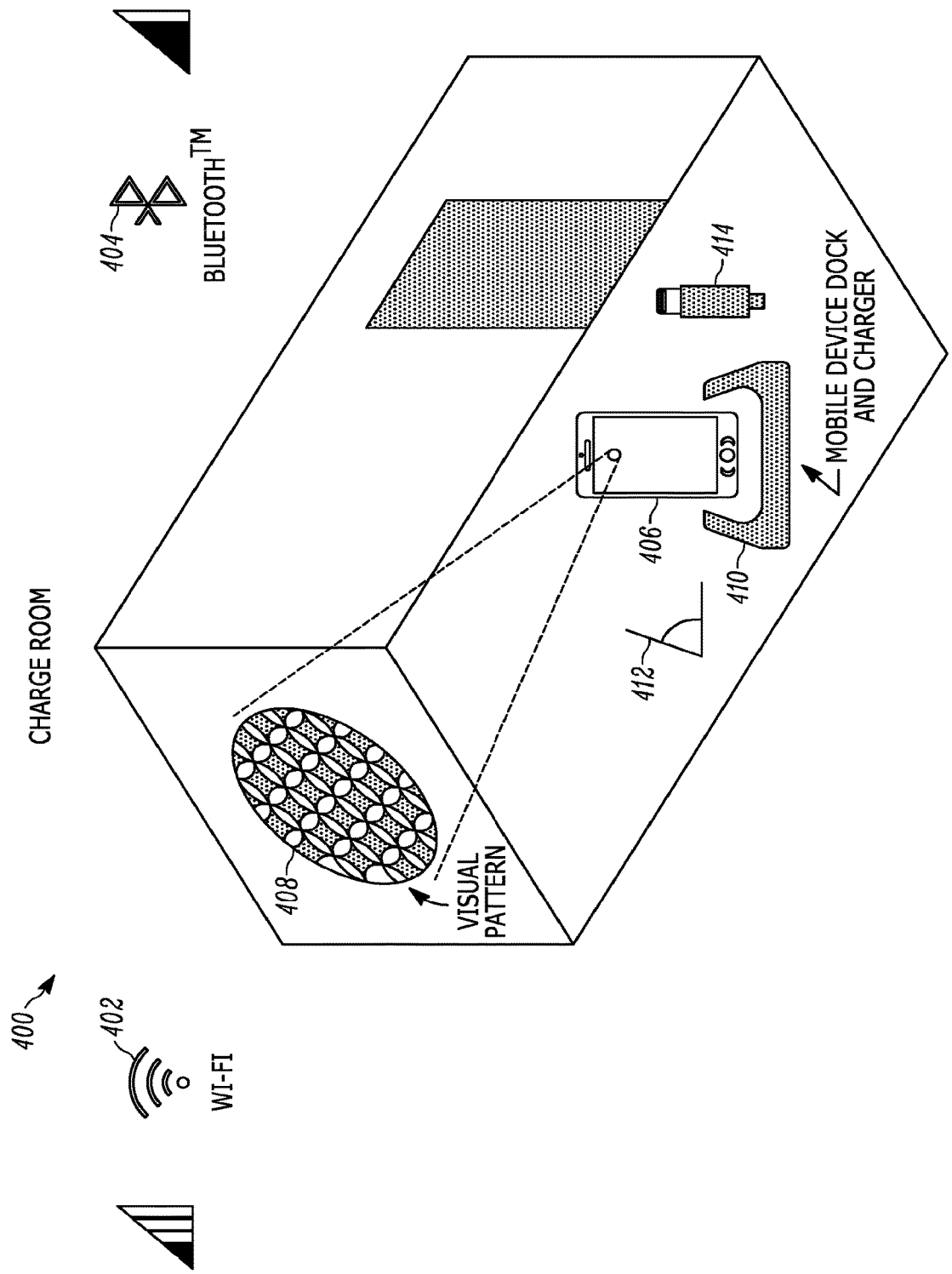
FIG. 4 is a schematic diagram of a charge room in a venue with charge room locationing in accordance with some embodiments.

FIG. 4 is a schematic diagram of a charge room 400 in a venue with charge room locationing in accordance with some embodiments. The charge room 400 includes characteristics that are associated with charge room 400 and not with other charge rooms at the same venue. One type of characteristic associated with the charge room is the presence of wireless networks 402 and 404. In the example of FIG. 4, the wireless networks are shown as Wi-Fi and Bluetooth™ networks, but other types of networks may also be used. The wireless networks have network identifiers and expected signal strengths that form a wireless network profile associated with the charge room 400. The wireless network profile of the charge room 400 may be surveyed and recorded during a configuration phase of the locationing system at the venue that includes charge room 400. The wireless network profile of the charge room 400 may be distributed to mobile detector device 406 such that when mobile detector device encounters the wireless network profile, it may transmit its location in charge room 400 to a server controlling the locationing system. Alternatively, or additionally, the mobile detector device 406 may transmit only the wireless network configuration sensed in the charge room 400 and a server controlling the locationing system may determine that the mobile detector device 406 is located in the charge room 400.

Other types of charge room characteristics of the charge room 400 are visual characteristics. In some implementations, the mobile detector device 406 includes one or more cameras that may be used to record a visual record of the device's surroundings. For example, a visual pattern 408 may be displayed on a wall of the charge room 400 that is large and distinctive enough (e.g., high contrast, etc.) such that a photograph taken by the mobile detector device 406 may be analyzed for a match with the visual pattern 408. A dock 410 into which the mobile detector device 406 may be inserted for charging may be positioned such that one of the cameras of the mobile detector device 406 is directed toward the visual pattern 408 when the device 406 is charging in the dock. The camera of the mobile device 408 may be triggered when the device receives a charging signal.

The visual pattern 408 need not be custom pattern created specifically for the charge room 400. Instead, the visual pattern 408 may include features of the charge room 400 such as location and size of windows, doors, furniture, artwork, paint or wallpaper color/pattern, plants, etc. that are visible in the charge room 400.

Another type of visual characteristic of the charge room 400 is a member that extends from the charge dock 410 and is visible to at least one of the cameras of the mobile detector device 406. An example of the member is an arm extending from the dock 410 that is adjustably positioned in the field of view of a camera of the mobile detector device 406. The arm may have a number, character, or other design that indicates association with the charge room 400 (e.g., serial number, room number, room descriptive name, etc.). Since the member extending from the charging dock 410 is attached to the dock, the member will move as the dock is turned or repositioned inside the charge room 400, thus reducing the likelihood that the mobile detector device 406 does not have the visual characteristic in view of a camera.

Another type of characteristic of the charge room 400 is a characteristic of the charging dock 410 that is detectable by the mobile detector device 406. The charging dock 410 may hold the mobile device 406 at an angle with respect to vertical that may be measured by the mobile device 406, for example using an accelerometer in the mobile device 406. In some implementations, the charging dock 410 itself is adjustable to select an angle of the device 406. In a venue with multiple charge rooms, the charging dock in each charging room may be set to a different angle to distinguish each charge room from the other charge rooms at the venue. In other implementations, the charge dock 410 includes a separate wedge accessory which may be distributed to the venue during a configuration phase of the locationing system, such that each charging dock 410 may be set to include a docket mobile detector device 406 at a different angle from the other charge rooms at the venue.

In addition to these charge room characteristics, charge signals may be sent by the mobile detector device 406 upon detection of an electrical signal received from the charging dock 410 via a connector 414. The charging dock 410 may transmit a signal to the mobile detector device 406 via the voltage or current supplied via the connector 414. In some implementations, each charge room in a venue with multiple charge rooms may supply a slightly different voltage or current to charge a mobile detector device. Alternatively, or additionally, the charge dock 410 may communicate with the mobile detector device 406 over a data connection using the connector 414 such as a USB, lightning, or similar data connection. The mobile detector device (e.g., an application executing on the mobile device or launched in response to detection of the connector 414) may receive information over the data connection identifying the charge room 400 and transmit a charge signal to a centralized server as a result.

Figure 5:
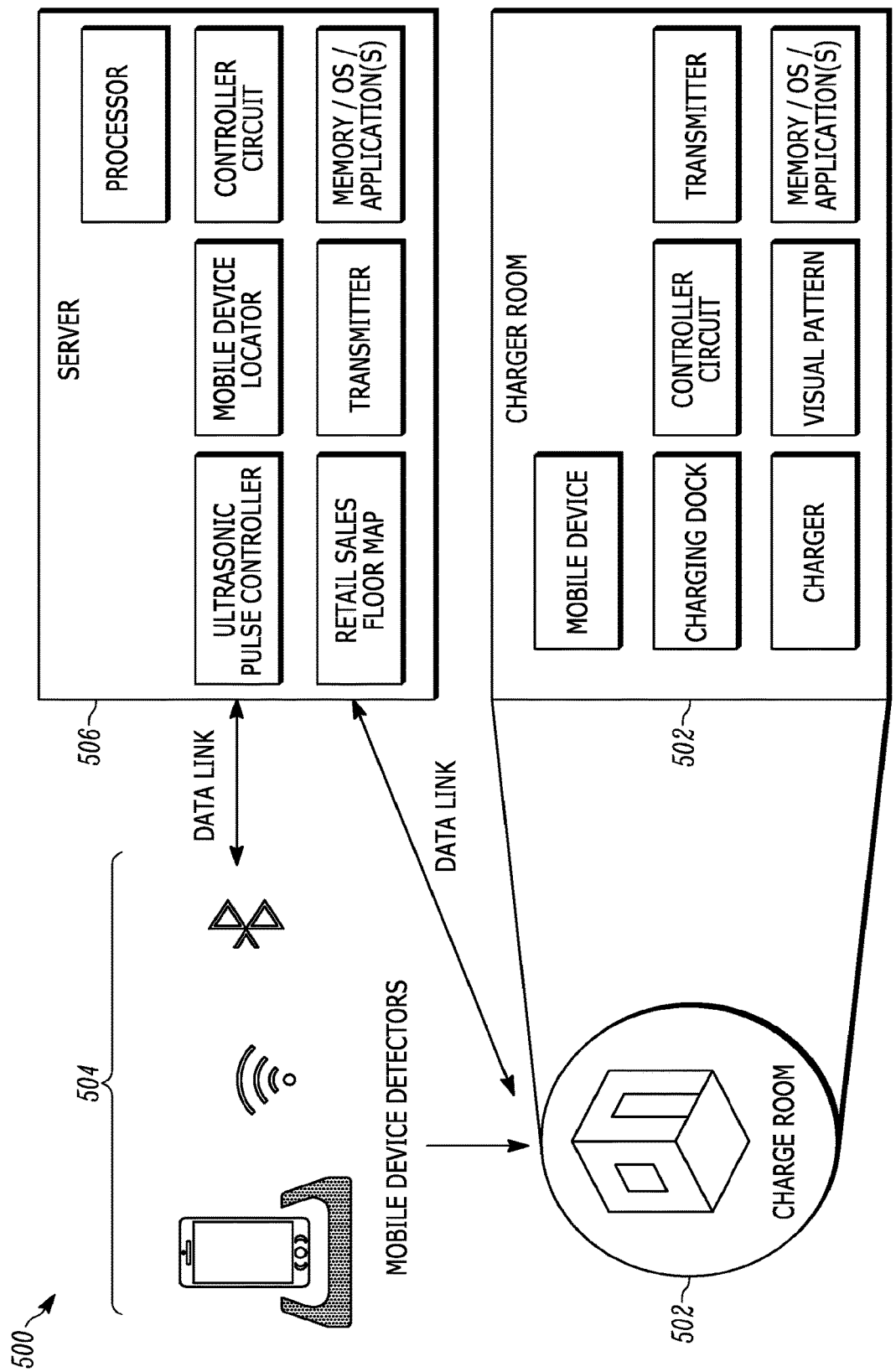
FIG. 5 is a block diagram of a charge room and a system for charge room locationing in accordance with some embodiments.

FIG. 5 is a block diagram of a charge room 502 in a system 500 for charge room locationing in accordance with some embodiments. The charge room 502 is located within a venue and includes components for charging and detecting the location of a mobile device. The charge room includes the mobile device, a charging dock, and a charger to supply power to the mobile device. The charge room 502 includes characteristics such as a visual pattern for identifying the charge room in comparison to other charge rooms at the venue. The charge room further includes a controller circuit connected to a memory (e.g., storing an OS and applications) and a transmitter for transmitting information from the mobile device to the locationing server 506. The controller circuit, memory, and transmitter may be included in the charging dock and may transmit location information received via the mobile device or may collect information regarding the presence of the device independently from the input features of the device (e.g., the charging dock may read a serial number from the device via the charging dock connector, the transmitter may recognize a wireless SSID of the mobile device, etc.).

The system 500 further includes a locationing server 506. The locationing server is in communication with mobile device detectors 504 (e.g., the charging dock, wireless networks, etc.). The locationing server 506 may receive charge signals and/or information from the charge room 502 and/or information from the mobile device detectors to locate a mobile device. The locationing server 506 may determine the location of a mobile device from the mobile device locator, for example, in response to receiving a charge signal from the mobile device determining from information stored in memory the location of the charger or charger station in a venue. The locationing server 506 further includes an ultrasonic pulse controller to send ultrasonic pulses to an array of transmitters disposed proximate to the venue. Based on a retail sales floor map, a mobile device locator may locate a mobile device based on signals received via the transmitter regarding the ultrasonic locationing pulses received by the mobile device, including where the ultrasonic locationing pulses are sent along with a charge signal without a charge signal. If the locationing server 506 does not receive locationing information regarding the mobile device through the mobile device detectors 504 or the ultrasonic pulse signals, the controller circuit of the locationing server 506 may assume the location of a mobile device based on a "snapping" determination based on the mobile device's last known location.

Figure 6:
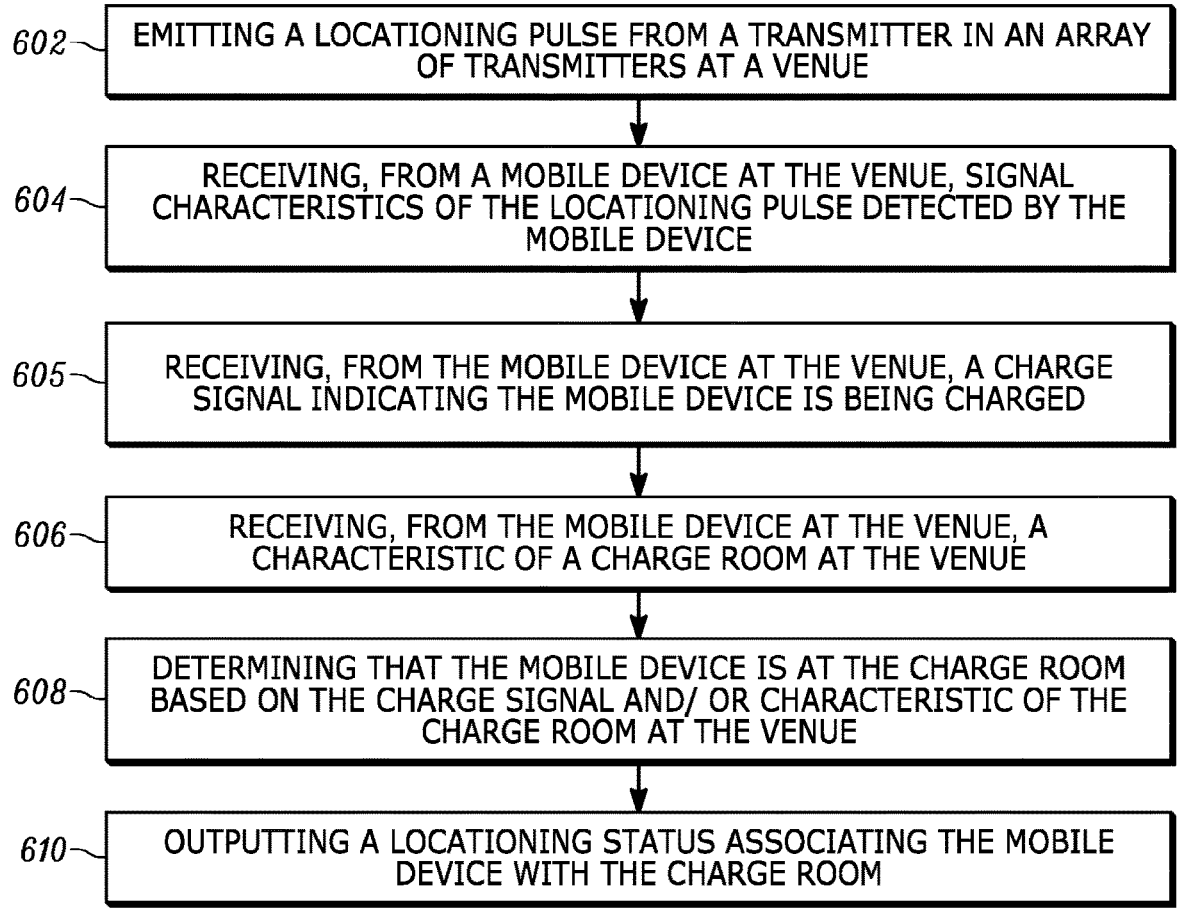
FIG. 6 is a flowchart of an example method of locationing a mobile device in a charge room in accordance with some embodiments.

FIG. 6 is a flowchart of an example method 600 of locationing a mobile device in a charge room or charger station location in accordance with some embodiments. The method 600 includes an emitting operation 602 that emits a locationing pulse from a transmitter in an array of transmitters at a venue. The emitting operation 602 may be performed by a locationing server that sends a signal to one or more of the transmitters in the array to emit the pulse. A receiving operation 604 receives, from a mobile device at the venue, signal characteristics of the locationing pulse detected by the mobile device. The signal characteristics include features of the received locationing pulse such as time of detection, frequency at detection, signal strength at detection that reveal the location of the mobile device within the venue.

A receiving operation 605 receives, from the mobile device at the venue, an indication of a charge signal indicating that the mobile device is being charged via an external power source. The receiving operation 605 may include having the mobile device detect the presence of an external AC source from which the mobile device communications a charge signal to a server. The charge signal may be communicated from the mobile device or in some examples from a charging dock communicatively coupled to the mobile device and coupled to the server through a communication network.

In the illustrated example, a receiving operation 606 receives, from the mobile device at the venue, a characteristic of a charge room at the venue. The receiving operation 606 may be optional and implemented in example implementations when there are multiple charge rooms and/or charger stations.

The receiving operation 606 may include any of several types of characteristics including without limitation a visual characteristic, a wireless network profile characteristic, a physical characteristic (e.g., of a charging dock), etc. The receiving operation 606 may include receiving a data transmission from the mobile device (e.g., via a wireless network) or receiving a data transmission from a charging dock that is communicatively coupled to the mobile device.

A determining operation 608 determines that the mobile device is at the charge room (or charger station) based on the charge signal alone, based on the charge signal in combination with the characteristics of the charge room at the venue, or based on the characteristics of the charge room without the charge signal. In the example of a charge signal alone, the determining operation 608 may identify the charge room or charger station associated with the location of the charger. In other examples, the determining operation 608 may include comparison of the characteristic of the charge room received in operation 606 to a set of characteristics known to be associated with the respective charge rooms at the venue. For example, during an installation and configuration phase of the locationing system, characteristics of the charge rooms may be collected and recorded. In some implementations, characteristics of the charge rooms are created specifically for the purpose of charge room locationing (e.g., establishing and naming wireless networks, hanging a visual symbol, etc.), and in other implementations, existing characteristics of the charge rooms are collected (e.g., existing wall paint color, window and door sizes and locations, etc.). The configuration phase of the locationing system may also include configuring a charging dock to supply a recognizable electrical signal (voltage, data signal, etc.) or another characteristic (e.g., a portion of the charging dock is unique and visible to a camera on the mobile device).

The collected characteristics of charge rooms may be compared to the characteristic of a charge room received in operation 606 to complete the determining operation 608. Some implementations may include variation parameters such that characteristics that are within the variation parameters may be considered to be a match to a charge room. For example, a wireless signal strength may fluctuate according to environmental conditions that change over time. The determining operation 608 may consider a wireless signal strength to be a match if the signal is within a margin. Similarly, visual analysis may require a correlation score between a known visual characteristic and a received characteristic to be within a margin to be considered to be a match. In other implementations, the best match between the received characteristic and the collected characteristic may determine in which charge room the mobile device is located.

An outputting operation 610 outputs a locationing status associating the mobile device with the charge room or charger station. The outputting operation 610 may include recording a mobile device as being in a particular charge room or charger station, creating a message to notify staff of mobile device location status, as an input to another component of the locationing system, etc. The outputting operation 610 need not produce a visual message to a user of the locationing system.

Figure 7:
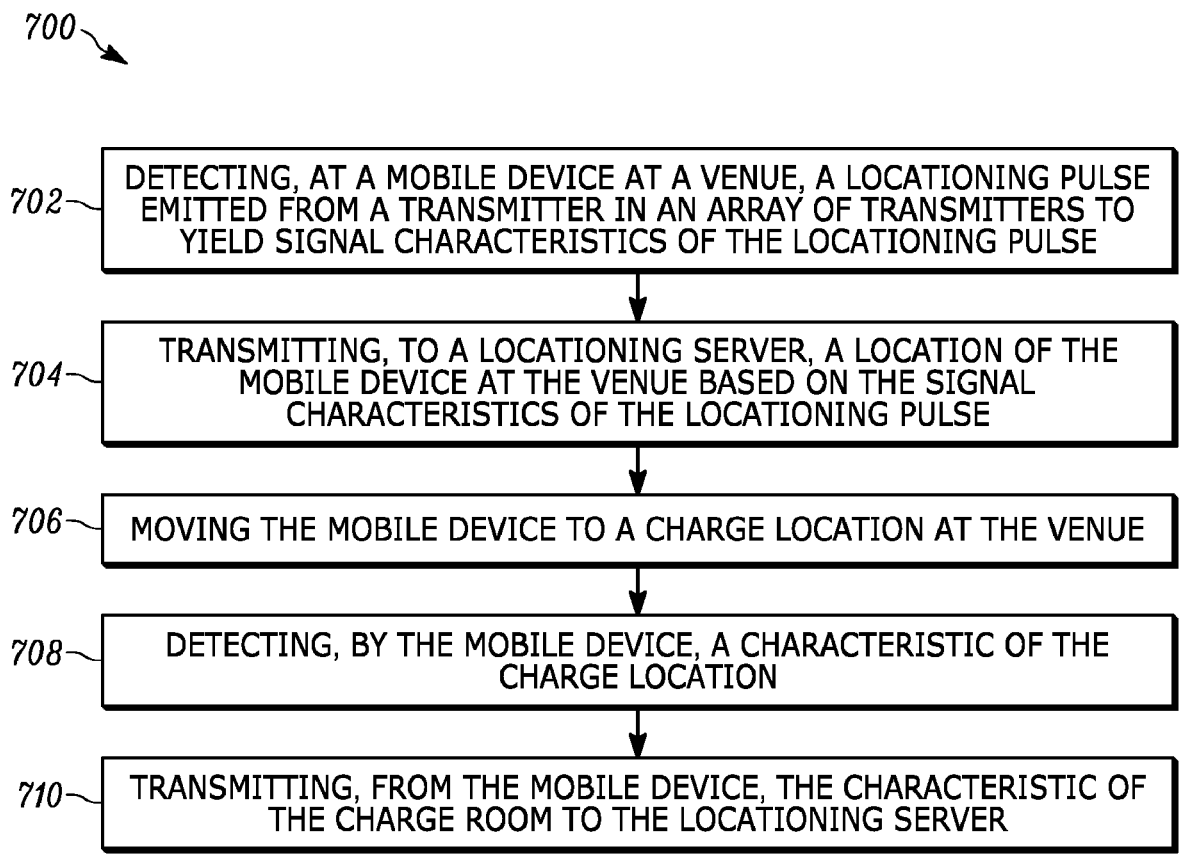
FIG. 7 is a flowchart of another example method of locationing a mobile device in a charge room in accordance with some embodiments.

FIG. 7 is a flowchart of another example method 700 of locationing a mobile device in a charge room in accordance with some embodiments. A detecting operation 702 detects, at a mobile device, a locationing pulse emitted from a transmitter in an array of transmitters to yield signal characteristics of the locationing pulse. A transmitting operation 704 transmits to a locationing server, a location of the mobile device at the venue based on the signal characteristics of the locationing pulse. The transmitting operation 704 may include a location determined based on the signal characteristics or it may include only the raw signal characteristics such that a determination of the location of the mobile device may be made at the locationing server.

A moving operation 706 moves the mobile device to a charge room at the venue. The moving operation may be to bring a mobile device to a charge room at the venue for recharging. In some implementations, the moving operation 706 includes placing the mobile device in a charge dock at the charge room. A detecting operation 708 detects by the mobile device a characteristic of the charge location. The detecting operation 708 may include directly or indirectly collecting characteristics of the charge location in which a mobile device is charging. The characteristics include a wireless network profile of the charging location, a physical characteristic of the charge location, an electrical characteristic of the charge location, etc. In some implementations, a characteristic of the charge room is established when the locationing system is configured to identify the charge room (e.g., a visual indication of the name or room number of the charge room). A transmitting operation 710 transmits from the mobile device, the characteristic of the charge location to the locationing server.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed:

1. A method of locationing a mobile device in a venue, the method comprising:
receiving, from a first locationing system, first location information associated with the mobile device at the venue;
associating a location with the mobile device based on the first location information;
receiving, from the mobile device at the venue, a charge signal indicating external charging of the mobile device and/or a characteristic of a charge location at the venue;
determining that the mobile device is at the charge location based on the charge signal and/or on the characteristic of the charge location at the venue; and
outputting a locationing override, wherein the locationing override causes the location of the mobile device associated with the first location information to be updated to that of the charge location.

2. The method of claim 1, further comprising:
determining, at the mobile device, the locationing override when the mobile device is determined to be at the charge location based on the charge signal and/or on the characteristic of the charge location at the venue.

3. The method of claim 2, wherein outputting the locationing override associating the mobile device with the charge location is performed by the mobile device.

4. The method of claim 1, further comprising:
determining, at a locationing server, the locationing override in response to the mobile device communicating an indication of the charge signal and/or on the characteristic of the charge location at the venue.

5. The method of claim 4, wherein outputting the locationing override associating the mobile device with the charge location is performed by the locationing server.

6. The method of claim 1, further comprising:
emitting a locationing pulse from a transmitter in an array of transmitters disposed proximate to the venue, the array of transmitters being controlled by a locationing server and defining a locationing zone of the venue; and
receiving, from the mobile device at the venue, signal characteristics of the locationing pulse detected by the mobile device.

7. The method of claim 6, wherein the charge location is located outside the locationing zone.

8. The method of claim 1, wherein the characteristic of the charge location is a communication network signal profile associated with the charge location.

9. The method of claim 1, wherein the characteristic of the charge location is received in response to detection of an external power source via a charging dock into which the mobile device is inserted.

10. The method of claim 9, wherein the characteristic of the charge location is an angle of orientation of the charging dock.

11. The method of claim 1, wherein the outputting is during a period of time during which the mobile device is at the charge location.

12. A method for locationing a mobile device at a charge location, the method comprising:
detecting, at a mobile device at a venue, a locationing pulse emitted from a transmitter in an array of transmitters to yield signal characteristics of the locationing pulse;
transmitting, to a locationing server, a location of the mobile device at the venue based on the signal characteristics of the locationing pulse;
detecting, by the mobile device, a charge signal and/or a characteristic of the charge location;
transmitting, from the mobile device, the charge signal and/or the characteristic of the charge location to the locationing server; and
updating, via the locationing server, the location of the mobile device based on the charge signal and/or the characteristic of the charge location, wherein the updating the location of the mobile device includes overriding the location of the mobile device at the venue determined based on the signal characteristics of the locationing pulse to that of the charge location.

13. The method of claim 12 wherein the characteristic of the charge location is a photograph taken by the mobile device when the mobile device receives a charging signal.

14. The method of claim 12, wherein the characteristic of the charge location is a communication network signal profile associated with the charge location.

15. The method of claim 12, wherein the characteristic of the charge location is a visual input detected by a camera of the mobile device.

16. A system for locationing a mobile device in a venue, the system comprising:
a venue locationing server for the venue, the venue including one or more mobile device charge locations; and
a mobile device configured to detect a charge signal indicating external charging of the mobile device and/or a characteristic of the one or more mobile device charge locations at the venue,
wherein one or more of the venue locationing server and the mobile device is configured to:
determine that the mobile device is at a charge location based on the charge signal and/or on the characteristic of the charge location at the venue; and
output a locationing override associating the mobile device with the charge location, and
wherein venue locationing server is further configured to update a location of the mobile device based on the locationing override such that the location of the mobile device is updated to that of the charge location.

* * * * *